United States Patent [19]

Mancinelli

[11] Patent Number: 4,543,395
[45] Date of Patent: Sep. 24, 1985

[54] TERMINALLY FUNCTIONAL POLYMERS

[75] Inventor: Paul A. Mancinelli, Aston, Pa.

[73] Assignee: Atlantic Richfield Company, Los Angeles, Calif.

[21] Appl. No.: 621,314

[22] Filed: Jun. 15, 1984

[51] Int. Cl.[4] ................................................ C08F 8/34
[52] U.S. Cl. .............................. 525/332.4; 525/332.9; 525/333.1; 525/333.2; 525/333.5; 525/348; 526/273; 526/286
[58] Field of Search .................. 525/348, 332.9, 333.1, 525/333.2, 333.5, 332.4; 526/273, 286

[56] References Cited

U.S. PATENT DOCUMENTS

| 3,786,116 | 0/1974 | Milkovich et al. | 260/885 |
| 3,846,393 | 0/1974 | Milkovich et al. | 260/93.5 |
| 4,169,115 | 9/1979 | Tung et al. | 525/348 |

Primary Examiner—Bernard Lipman
Attorney, Agent, or Firm—Lewis J. Young

[57] ABSTRACT

The alkyllithium initiated preparation of terminally functional polymers in high yield is accomplished by first capping a macromolecular polymer with an alkylene sulfide prior to terminating the molecule with a halogenated compound containing a polymerizable moiety.

4 Claims, No Drawings

TERMINALLY FUNCTIONAL POLYMERS

BACKGROUND OF THE INVENTION

The present invention relates to terminally functional polymers known as macromolecular monomers and to an improved process for their preparation.

The preparation of macromolecular monomers has been described in U.S. Pat. No. 3,786,116, which is incorporated in its entirety herein.

The process for preparation involves the anionic polymerization of, for example, styrene with or without capping the polystyrene with ethylene oxide, followed by the termination of the polymer with a halogenated compound containing a polymerizable moiety to form macromolecular chains terminated with the polymerizable moiety. This process leads to the formation of alkali metal chloride as byproduct. Although the process works with sodium or potassium initiators, it does not work well when a lithium initiator is used.

The patent teaches two different synthetic methods leading to the formation of the macromolecular monomers. The first method involves the termination of polystyrene lithium with a halogen containing compound which also contains a polymerizable moiety, such as epoxy or styrene group. Unfortunately, the polystyryl lithium group reacts with the polymerizable group as well as the halogen group. This causes polymer dimerization and other undesirable side reactions. The second method involves converting the polystyryl carbanion into a lithium alkoxide anion by capping with ethylene oxide prior to the addition of the halogen containing compound. This terminating sequence is designed to render the living polymer less susceptible to reaction at the polymerizable functional group by converting the highly reactive polystyryl lithium to a less reactive and hence more selective lithium alkoxide intermediate.

In contrast to the polystyryl carbanions, the alkoxide anions were found to be generally unreactive with either part of the halogen containing compound, i.e., with either the halogen or the polymerizable group.

BRIEF SUMMARY OF THE INVENTION

I have now found that the substitution of an alkylene sulfide for the ethylene oxide as capping agent for the polymeric carbanion from lithium initiation prior to the addition of the terminating compound yielded greater than 80% of the desired macromonomer terminated with the polymerizable monomer groups. The reaction of polymer lithium with the sulfide results in the formation of lithium sulfide anion intermediates which are regioselective toward the chloride group of the terminating compound.

DETAILED DESCRIPTION OF THE INVENTION

The macromolecular monomers of special interest are made by polymerizing monomers susceptible to anionic polymerization with an alkyllithium initiator to polymer chains of number average molecular weight from 300 to 150,000, capping the polymer chains with an alkylene sulfide and then terminating the chains with a halogenated compound containing a polymerizable moiety.

The macromolecular monomers formed by the above process have the general structure

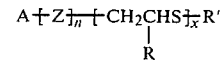

where A is the alkyl portion of the initiator, Z is a repeating monomeric unit of a monomer susceptible to anionic polymerization or mixtures of said monomers, n is a positive integer from 3 to 1500, R is hydrogen, $C_1$–$C_{10}$ alkyl, or phenyl, x is a positive integer of at least 1, and R' is a radical formed by removal of halogen from a halogenated compound containing a polymerizable moiety.

Those monomers susceptible to anionic polymerization are well known and the present invention contemplates the use of all anionically polymerizable monomers. Non-limiting illustrative species include vinyl aromatic compounds, such as styrene, alpha-methylstyrene, vinyl toluene and its isomers; vinyl unsaturated amides such as N,N-dilower alkyl acrylamides, e.g., N,N-dimethylacrylamide; acrylonitrile and methacrylonitrile; lower alkyl and allyl acrylates and methacrylates, including methyl, t-butyl acrylates and methacrylates; vinyl pyridines; dienes including isoprene and butadiene. The term "lower" is used above to denote organic groups containing eight or fewer carbon atoms. The preferred olefinic containing monomers are conjugated dienes containing 4 to 12 carbon atoms per molecule and the vinyl-substituted aromatic hydrocarbons containing up to about 12 carbon atoms.

Mixtures of these monomers susceptible to anionic polymerization may be used to prepare copolymers having random, tapered, or block structures.

The alkylene sulfide used for the capping reaction may be compounds of structure

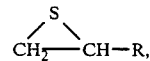

where R may be hydrogen, $C_1$ to $C_{10}$ alkyl, or phenyl. The ratio of alkylene sulfide to lithium initiator used should be at least 1.0 but will preferably be between 1.5 and 3.0. The excess sulfide may form polymeric blocks of the alkyl sulfide capping the polymer chains.

The capped macromolecular chains are terminated by reaction of the living polymer chains with a halogen-containing compound which also contains a polymerizable moiety, such as an olefinic group or an epoxy or thioepoxy group. Suitable halogen-containing terminating agents include: the vinyl haloalkyl ethers wherein the alkyl groups contain six or fewer carbon atoms such as methyl, ethyl, propyl, butyl, isobutyl, sec-butyl, amyl or hexyl; vinyl esters of haloalkanoic acids wherein the alkanoic acid contains 6 or fewer carbon atoms, such as acetic, propanoic, butyric, pentanoic, or hexanoic acid; olefinic halides having 6 or fewer carbon atoms such as vinyl halide, allyl halide, methallyl halide, 6-halo-1-hexene, etc., halides of dienes such as 2-halomethyl-1,3-butadiene; epihalohydrins; haloalkylmaleic anhydrides; haloalkylmaleate esters; vinyl haloalkylsilanes; and vinyl haloalkaryls, such as vinylbenzyl chloride.

The halo groups may be chloro, fluoro, bromo, or iodo; preferably it is chloro. The preferred halogenated compounds useful as terminating agents are epichlorohydrin and chloromethylstyrene. The chloromethylstyrene may be the ortho-, meta-, or para-derivative, or mixtures thereof. The ratio of terminating agent to lithium initiator may be between 1.0 and 15. An excess of terminating agent is desirable to ensure complete termination of the macromolecular monomer.

The macromolecular monomers may be separated from the solvent in which it was prepared by any of the known techniques such as precipitation with nonsolvent, evaporation of the solvent and steam jet coagulation. The isolation and recovery of the macromolecular monomer is not a critical feature of the invention. In fact, if copolymerization of the macromolecular monomer with any of the several known comonomers is desired, the macromolecular monomer may be used without recovery by adding the second monomer to the reaction mixture and conducting copolymerization in the same solvent as the macromolecular monomer was prepared.

The concentration of the monomer charged to the reaction vessel during macromolecular monomer preparation can vary widely, and is limited by the ability of the reaction equipment to dissipate the heat of the polymerization and to properly mix the resulting viscous solutions of the living polymer. Concentrations of monomer as high as 60% by weight or higher based on the weight of the reaction mixture can be used. However, the preferred monomer concentration is from about 5% to about 35% in order to achieve adequate mixing.

An inert solvent generally is used to facilitate heat transfer and adequate mixing of initiator and monomer. Preferred solvents are the aliphatic and cycloaliphatic hydrocarbons such as n-hexane, n-heptane, n-octane, cyclohexane and the like.

The temperature of the polymerization will depend on the monomer, but the reaction can be carried out at temperatures ranging from $-100°$ C. up to about 100° C. When using aliphatic hydrocarbon diluents, the preferred temperature range is from about $-10°$ C. to about 100° C.

The hydrocarbyllithium initiators useful in the invention are the known alkyllithium compounds, such as methyllithium, n-butyllithium, sec-butyllithium; the cyclo-alkyllithium compounds, such as cyclo-hexyllithium; and the aryllithium compounds, such as phenyllithium.

The amounts of hydrocarbyllithium added should be between 0.2 and 300 millimoles per mole of monomer. The total amount of initiator used depends on the molecular weight desired.

The macromolecular monomers prepared in this invention can be copolymerized with other monomers by known methods using free-radical, anionic, or cationic initiators as appropriate for the particular terminal functions of the macromolecular monomers and the type of comonomer used. Thus, epoxy-terminated monomers may be cationically initiated to copolymerize with, for example, tetrahydrofuran to form copolymers. Similarly, styrene-terminated macromolecular monomers can be free radically initiated to form copolymers with any the known comonomers which polymerize with free-radical initiation. Such comonomers include the acrylates, methacrylates, acrylonitriles, styrenes, and many others. The possibilities for co-, ter- and higher polymerizations by using mixtures of monomers are unlimited. The resulting graft copolymers may contain from 1% to 95% by weight of the macromolecular monomer and 99% to 5% by weight of the copolymerizable monomer. The copolymerizable monomers and the conditions for such copolymerization are thoroughly discussed in U.S. Pat. No. 3,786,116 at columns 14–22 and, as previously stated, are incorporated in their entirety into this specification.

The invention is illustrated further by the following examples which, however, are not to be taken as limiting in any respect. In all cases, all materials should be pure and care should be taken to keep the reacted mixture dry and free of contaminant. All parts and percentages, unless expressly stated to be otherwise, are by weight.

EXAMPLE I

Synthesis of a 5000 molecular weight, epoxy terminated polystyrene macromonomer

Experiments were performed in a one-gallon reactor in accordance with the following recipe. In Step 1 a solution of cyclohexane and styrene was titrated at 60° C. by s-butyllithium to a faint orange end-point to remove impurities in the system. Very shortly thereafter the polymerization was initiated using an effective initiator charge of s-Butyllithium producing a polystyrene front block with the desired molecular weight. The remaining components were added in the order appearing in the recipe.

| Step I | |
|---|---|
| Cyclohexane, ml | 1350 |
| Styrene, g | 242.5 |
| s-Butyllithium (effective) mmol | 48.5 |
| Polymerization Time, min | 10 |
| Polymerization Temperature, °C. | 60° |
| Step II | |
| Ethylene Sulfide, mmol | 36.4 |
| Reaction Time, min | 10 |
| Ethylene Sulfide, mmol | 36.4 |
| Reaction Time, min | 10 |
| Reaction Temperature, °C. | 60° |
| Step III | |
| Epichlorohydrin, mmol | 727.5 |
| Reaction Temperature, °C. | 60° |
| Reaction Time, min | 60 |

As can be seen, the ethylene sulfide/Li ratio was 1.5, while the epichlorohydrin/Li ratio was 15. Analysis of the macromolecular monomer according to ASTM-D1652 showed 86.7% epoxy termination of the polystyrene molecule.

Attempts to repeat Example I replacing the ethylene sulfide with ethylene oxide according to U.S. Pat. No. 3,786,116 or U.S. Pat. No. 3,846,393 gave only polystyrene of molecular weight 5,000 without any epoxy group termination.

EXAMPLE II

Synthesis of a 13,000 molecular weight, epxoy terminated polystyrene macromonomer In Step 1 styrene was added to the reactor at a rate of 75 g/min.

| Step I | |
|---|---|
| Cyclohexane, ml | 1926 |
| Styrene, g | 1000 |
| s-Butyllithium (effective) mmol | 76.9 |
| Polymerization Time, min | 15 |
| Polymerization Temperature, °C. | 60° |
| Step II | |
| Ethylene Sulfide, mmol | 76.9 |
| Reaction Time, min | 10 |
| Ethylene Sulfide, mmol | 76.9 |
| Reaction Time, min | 10 |

| -continued | |
|---|---|
| Reaction Temperature, °C. | 60° |
| Step III | |
| Epichlorohydrin, mole | 1.153 |
| Reaction Temperature, °C. | 60° |
| Reaction Time, min | 60 |

SUMMARY OF TERMINATING SEQUENCE

Ethylene Sulfide/Li Ratio=2
Epichlorohydrin/Li Ratio=15
Again, analysis of the macromolecular monomer according to ASTM-D1652 showed 90.4% epoxy termination of the polystyrene molecules.

EXAMPLE III

Synthesis of a 13,500 molecular weight epoxy terminated 98/2 styrene/butadiene diblock macromonomer In Step 1 styrene was added at a flow rate of 75 g/min.

| Step I | |
|---|---|
| Cyclohexane, ml | 2567 |
| Styrene, g | 500 |
| s-Butyllithium (effective) mmol | 38.5 |
| Polymerization Time, min | 15 |
| Polymerization Temperature, °C. | 60° |
| Step II | |
| Butadiene, g | 10.4 |
| Reaction Time, min | 15 |
| Reaction Temperature, °C. | 60° |
| Step III | |
| Ethylene sulfide, mmol | 38.5 |
| Reaction Time, min | 10 |
| Ethylene Sulfide, mmol | 38.5 |
| Reaction Time, min | 10 |
| Reaction Temperature, °C. | 60° |
| Step IV | |
| Epichlorohydrin, mmol | 577.5 |
| Reaction Time, min | 60 |
| Reaction Temperature, °C. | 60° |

SUMMARY OF TERMINATION SEQUENCE

Ethylene Sulfide/Li Ratio=2.0
Epichlorohydrin/Li Ratio=15
Analysis showed 80% epoxy termination of the macromonomer.

EXAMPLE IV

Copolymerization of a 5000 molecular weight epoxy terminated polystyrene macromonomer with tetrahydrofuran using a cationic initiator system In a dry, 500 ml 3-Necked flask equipped with a thermometer and mechanical stirrer the following ingredients were reacted under a nitrogen atmosphere.

| Recipe | | |
|---|---|---|
| Tetrahydrofuran, g | | 267 |
| 5K PS macromer, g | | 16.0 |
| Propylene oxide, g | ⎫ | .4 |
| | ⎬ initiator | |
| BF₃ Etherate, mmol | ⎭ system | 6.1 |
| Reaction Time, hr | | 3 |
| Reaction Temperature, °C. | | 0 |

Gel Permeation Chromatrograph characterization of the final reaction mixture indicated that 70% of the PS macromonomer copolymerized under these conditions to give a 27/73 styrene/THF graft copolymer.

EXAMPLE V

Synthesis of a 13000 molecular weight vinylphenyl terminated polystyrene macromonomer Experiments were performed in a one-gallon reactor in accordance with the following recipe.

| Step I | |
|---|---|
| Cyclohexane, ml | 1350 |
| Styrene, g | 242.5 |
| s-Butyllithium (effective) mmol | 18.7 |
| Polymerization Time, min | 10 |
| Polymerization Temperature, °C. | 60° |
| Step II | |
| Ethylene Sulfide, mmol | 14.0 |
| Reaction Time, min | 10 |
| Ethylene Sulfide, mmol | 14.0 |
| Reaction Time, min | 10 |
| Reaction Temperature, °C. | 60° |
| Step III | |
| Vinyl Benzyl Chloride, mmol | 56.1 |
| Reaction Temperature, °C. | 60° |
| Reaction Time, min | 60 |

SUMMARY OF TERMINATING SEQUENCE

Ethylene Sulfide/Li Ratio=1.5
Vinyl Benzyl Chloride/Li Ratio=3.0
Copolymerization of the resulting vinylphenyl terminated polystyrene macromonomer with n-butyl acrylate using a free radical initiator was performed in citrate bottles according to the following recipe. Bottles were rotated in a constant temperature bath for the specified time.

| Recipe | |
|---|---|
| Ethyl Acetate, g | 125 |
| 13 K PS macromer, g | 8.6 |
| n-Butyl Acrylate, g | 25.8 |
| VAZO 64 (AIBN), g | .07 |
| Polymerization Temperature, °C. | 60° |
| Polymerization Time, hr | 16 |

Gel Permeation Chromatography characterization of the final reaction mixture indicated that 91% of the PS macromonomer copolymerized under these conditions to give a 25/75 styrene/n-Butyl acrylate graft copolymer. These results indicate that the PS macromonomer is at least 91% functional.

Here again, replacement of the ethylene sulfide in Step II with ethylene oxide gave only 13000 molecular weight polystyrene with no vinylphenyl terminal groups.

What is claimed is:

1. A macromolecular monomer having the general formula

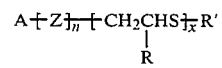

where A is the alkyl portion of an alkyllithium initiator, Z is a repeating monomeric unit of a monomer susceptible to anionic polymerization, n is a positive interger from 3 to 1500, R is either hydrogen, $C_1$-$C_{10}$ alkyl, or phenyl, x is a positive integer of at least 1, and R' is a radical formed by removal of the halogen from a halogenated compound containing a moiety polymerizable by free-radical, cationic, or anionic initiators.

2. The macromolecular monomer of claim 1 wherein Z is a repeating monomeric unit of a monomer selected from the group consisting of styrene, substituted styrenes, isoprene, butadiene, and mixtures thereof.

3. The macromolecular monomer of claim 1 wherein R is either hydrogen, methyl, or phenyl.

4. The macromolecular monomer of claim 1 wherein R' is either glycidyl or vinylbenzyl radical.

* * * * *